US006873960B1

(12) United States Patent
Wood et al.

(10) Patent No.: US 6,873,960 B1
(45) Date of Patent: *Mar. 29, 2005

(54) METHODS FOR REDUCING FRAUD IN HEALTHCARE PROGRAMS USING A SMART CARD

(76) Inventors: Richard Glee Wood, 4627 Cashel Cir., Houston, TX (US) 77069; Wesley Jack White, Jr., 6219 Squires Ct., Spring, TX (US) 77389

( * ) Notice: Subject to any disclaimer, the term of this patent is extended or adjusted under 35 U.S.C. 154(b) by 61 days.

This patent is subject to a terminal disclaimer.

(21) Appl. No.: 10/443,194

(22) Filed: May 22, 2003

Related U.S. Application Data

(63) Continuation-in-part of application No. 10/428,213, filed on May 2, 2003.
(60) Provisional application No. 60/461,226, filed on Apr. 8, 2003.

(51) Int. Cl.[7] .............................................. G06F 17/60
(52) U.S. Cl. .............................................. 705/4; 705/2
(58) Field of Search ...................... 705/2, 3, 4; 600/300

(56) References Cited

U.S. PATENT DOCUMENTS

| 5,884,271 | A | * | 3/1999 | Pitroda ........................... 705/1 |
| 6,011,858 | A | * | 1/2000 | Stock et al. ................ 382/115 |
| 6,012,035 | A | * | 1/2000 | Freeman et al. ............... 705/2 |
| 6,163,770 | A | | 12/2000 | Gamble .......................... 705/4 |
| 6,208,973 | B1 | * | 3/2001 | Boyer et al. .................... 705/2 |

OTHER PUBLICATIONS

Eiland, "A Bill to be Entitled an Act." Acts of the 75th Legislature, Regular Session, 1997.
Ogden, "A Bill to be Entitled and Act." Acts of the 78th Legistlature, Regular Session, 2003.

"Texas Senate Special Committe on Prompt Payment of Health Care Providers." Interim Report to the 78th Legislature, Nov. 2002.

Rehnquist, Janet. "Improper Fiscal Year 2002 Medicare Fee–for–Service Payments," Jan. 8, 2003 (A17–02–02202).

* cited by examiner

Primary Examiner—Joseph Thomas
Assistant Examiner—Christopher L. Gilligan
(74) Attorney, Agent, or Firm—Buskop Law Group, P.C.; Wendy Buskop

(57) ABSTRACT

Methods for reducing fraud in a prescription healthcare program are described herein. The methods generally include registering a service provider with a prescription healthcare provider and issuing a service provider identification code to the service provider and registering an item of the service provider with the prescription healthcare provider to create a registered item and identifying a claim code for each registered item. The item can include at least one service, at least one good and combinations thereof. The method further includes issuing a smart card to an person related to the prescription healthcare program, wherein the smart card has a smart card identification feature to identify the person and using the smart card to determine if the person is the authorized bearer of the smart card and is eligible for benefits from the prescription healthcare program. The method further includes using the smart card- to facilitate a first transmission from the service provider to the prescription healthcare provider. The method further includes using the smart card to facilitate the second transmission from the prescription healthcare provider to the service provider. In one embodiment, the method includes using the smart card to facilitate a second transmission from the service provider to the prescription healthcare provider.

20 Claims, 3 Drawing Sheets

| Individual Name (502) | Individual SSN (512) | | Other Phone Numbers (532) |
|---|---|---|---|
| Individual Address (504) | Government Benefit Program Name (514) | Government Email (522) | Instructions on How to Contact Government (534) |
| Individual Phone (506) | Government Benefit Program Address (516) | Government Social Service Program Administrator (524) | Expiration Date of the Card (536) |
| Individual Fax (508) | Government Phone (518) | Description of Social Service Benefit Plan (526) | Government Website (538) |
| Individual Email (510) | Government Fax (520) | Individual Payment Amount (528) | |
| | | Individual's Benefit History (530) | Chip to Link to the Government for Information on the Benefit Program (540) |

FIG. 2

Medical Security

SMART CARD

John Doe

3390 01 12 334 309

XYZ Medical Insurance

Insta-Pay or Express-Pay

Emergency Information

*FIG. 3*

METHODS FOR REDUCING FRAUD IN HEALTHCARE PROGRAMS USING A SMART CARD

CROSS-REFERENCE TO RELATED APPLICATIONS

This application is a continuation in part of co-pending U.S. patent application Ser. No. 10/428,213 filed May 2, 2003, which claims priority to provisional U.S. Patent Application Ser. No. 60/461,226 filed Apr. 8, 2003 entitled "Method for Reducing Fraud in Government Benefit Programs Using a Smart Card", both of which are incorporated herein by reference.

BACKGROUND

1. Field of Invention

Embodiments of the invention relate to reducing fraud in prescription healthcare programs using a smartcard.

2. Description of Related Art

Government agency providers of benefits experience difficulties, such as fraud, as a result of persons "double dipping" in government programs. In addition, service providers can inadvertently "double bill" or inappropriately bill for services rendered. Further, proper service and goods providers for government benefits programs frequently wait long periods of time to get paid for their services or goods rendered to the eligible person, such as employees. This situation has become tedious and causes benefit costs to be very high, reducing overall benefits available due to these fraud issues.

Methods and apparatus exist in an attempt to streamline the insurance claim payment process, such as the method disclosed in U.S. Pat. No. 6,163,770. This patent discloses using a digital electrical apparatus to generate output for insurance documentation for a first insurance policy having a first risk and claims while revealing a concurrent second insurance policy for a second risk, wherein the second risk is different from the first.

The processor of this method is connected to a memory device for storing and retrieving operations including machine-readable signals in the memory device, to an input device for receiving input data and converting the input into input electrical data, to a visual display unit for converting output electrical data into output having a visual presentation, to a printer for converting the output electrical data into printed documentation, wherein the processor is programmed to control the apparatus to receive the input data and to produce the output data by steps including: inputting actuarial assumptions defining the first insurance policy; and computing a value of a specific financial attribute of the first insurance policy; the method further including the step of inserting the value of the financial attribute in the first insurance policy and other printed documentation related to the first insurance policy. However, this method did not apply to government programs in a simple and direct manner, as with the system disclosed herein, which was designed to meet these needs.

Therefore, a need exists for a system where the government advances funds to pay for the services of a service or goods provider, and as a result, an eligible person does not have to handle money in order to receive benefits. This need is particularly great for incapacitated persons, such as those in nursing homes, who are no longer able to handle funds or complicated transactions.

Additionally, a need exists for a method to reduce the magnitude of transaction costs involved in reviewing and adjudicating payment requests to a governmental agency. Such a method would reduce the rate of increase of government benefit costs and/or enable more benefits to be provided to more people. Furthermore, a method is needed to reduce the traditionally high cost of benefits administration, including the review and adjudication of payment requests which results from benefit service or goods providers having to act as "banks" or "credit sources" for persons eligible for the benefit.

SUMMARY

Embodiments of the invention include a method for reducing fraud in a prescription healthcare program. The methods generally include registering a service provider with a prescription healthcare provider and issuing a service provider identification code to the service provider and registering an item of the service provider with the prescription healthcare provider to create a registered item and identifying a claim code for each registered item. The item can include at least one service, at least one good and combinations thereof.

The method further includes issuing a smart card to an person related to the prescription healthcare program, wherein the smart card has a smart card identification feature to identify the person and using the smart card to determine if the person is the authorized bearer of the smart card and is eligible for benefits from the prescription healthcare program. The method further includes using the smart card to facilitate a first transmission from the service provider to the prescription healthcare provider. The method further includes using the smart card to facilitate the second transmission from the prescription healthcare provider to the service provider.

In one embodiment, the method includes a first and second transmission. The first transmission includes the service provider identification code; the person identification code, proposed information selected from the group including proposed item information for the person, corresponding claim codes for the proposed item, a statement stating that the proposed item is available to be provided to the person upon receipt of a second transmission and combinations thereof and a request to confirm the person's eligibility for benefits under the prescription healthcare program, a validation that the proposed item is approved for the person, the service provider's eligibility to render services or provide goods under the prescription healthcare program and a request to participate in an accelerated payment program for the proposed item. The first transmission can further include a claim codes list for items to be rendered and a request for accelerated payment by the service provider to the prescription healthcare provider.

The second transmission includes the person's eligibility for benefits under the prescription healthcare program, a validation on whether the proposed item is approved for the person, a validation on whether the service provider is eligible to render services under the prescription healthcare program, a determination on whether an accelerated payment program is available and, if available, an authorization for accelerated payment, an authorization code to provide the proposed item, a requirement to obtain and retain an acknowledgement by the person that information on the item was provided to the person by the service provider and a requirement to obtain and retain an acknowledgement that the product or service has been received by the person from the service provider.

In yet another embodiment, the method includes a first transmission, a second transmission and a third transmission, wherein the third transmission is from the service provider to the prescription healthcare provider. In such an embodiment, the first transmission includes a service provider identification code, a personal identification code, proposed information selected from the group including proposed product information for the person, proposed service information for the person, corresponding claim codes for the proposed product, and corresponding claim codes for the proposed service. The first transmission further includes a request to confirm the person's eligibility for benefits under the healthcare program, a validation that the proposed good or service is approved for the person, the service provider's eligibility to render services or provide goods under the prescription healthcare program and an optional request to participate in an accelerated payment program for the proposed good or the proposed service.

The second transmission includes the person's eligibility for benefits under the prescription healthcare program, a validation that the proposed good or proposed service is approved for the person, a validation of the service provider's eligibility to render services under the prescription healthcare program, an optional confirmation that an accelerated payment program is available and an authorization code to provide the proposed product and/or proposed service.

The third transmission includes a claim codes list for services rendered, acknowledgement by the person that information on the product and/or service was provided to the person, acknowledgement that the product or service has been received from the service provider and a request for accelerated payment by the private healthcare provider to the service provider.

BRIEF DESCRIPTION OF THE DRAWINGS

Aspects of the present invention will be described in greater detail with reference to the appended figures.

FIG. 2 illustrates a diagrammatic representation of a smart card usable in the invention.

FIG. 3 illustrates a smart card.

DETAILED DESCRIPTION

Figure 1:
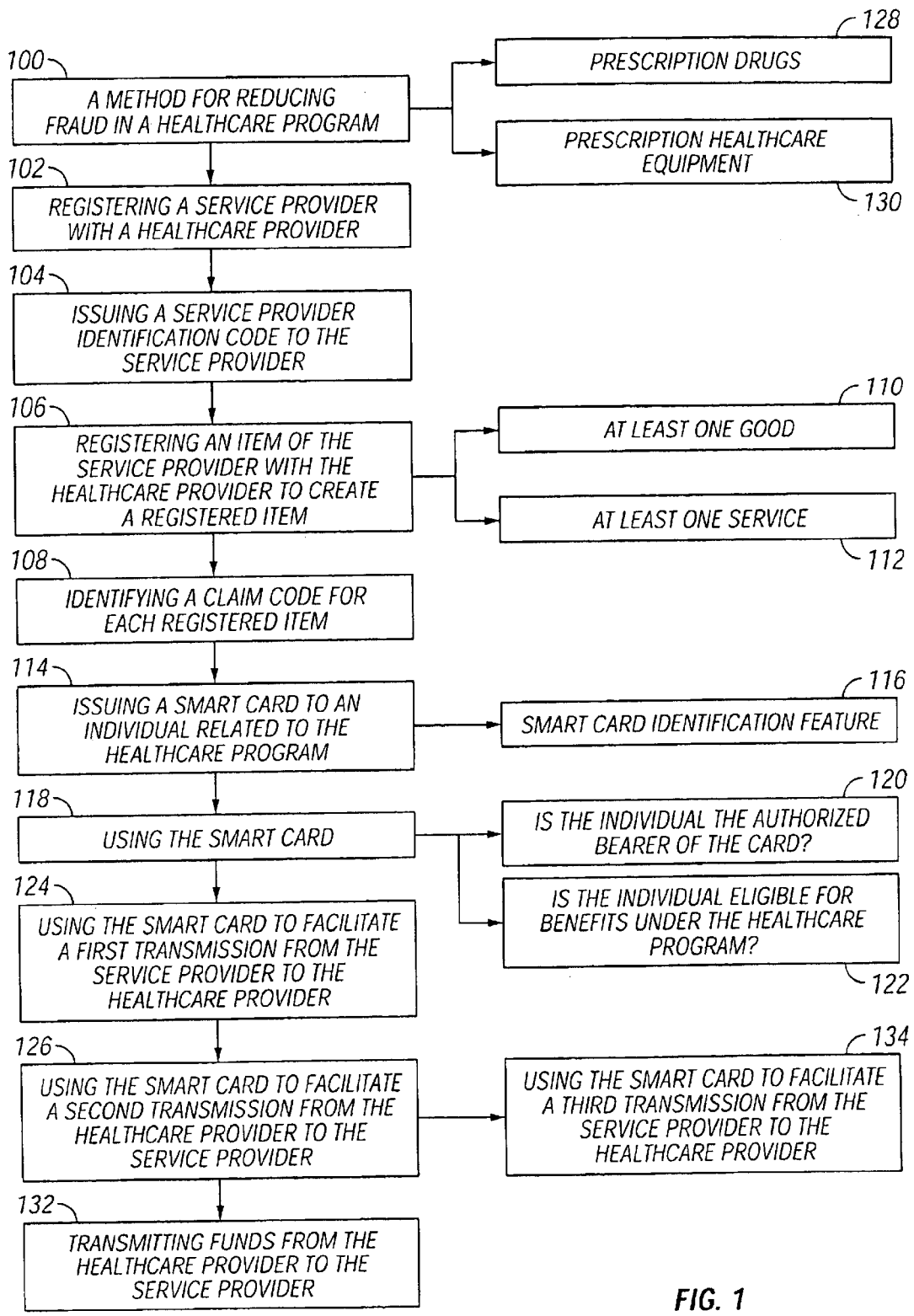
FIG. 1 illustrates a diagrammatic representation of the overall method of the invention.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the pertinent art to make and use the inventions, when the information in this patent is combined with available information and technology. Various terms as used herein are defined below. To the extent a term used in a claim is not defined below, it should be given the broadest definition persons in the pertinent art have given that term as reflected in printed publications and issued patents.

Embodiments of the invention relate to a method for accelerating payment to a service or goods provider from a prescription healthcare provider, such as a private insurance company or a physician.

FIG. 1 illustrates a diagrammatic representation of embodiments of the invention, which are described in further detail below. Embodiments of the invention generally include a method for reducing fraud in a prescription healthcare program 100. The term prescription healthcare program includes prescription drugs, including scheduled and non-scheduled drugs 128 and prescription healthcare equipment 130, such as oxygen tanks. As used herein, the term "prescription" means scripted by a licensed physician. The prescription healthcare program can be Medicare, Medicaid, other federal health programs, private healthcare insurance programs or other private health programs, for example.

The method further includes registering a service provider with a prescription healthcare provider 102 and issuing a service provider identification code to the service provider 104. The prescription healthcare provider can be an insurance company, a drug manufacturer, a healthcare equipment manufacturer, a drug distributor or a healthcare distributor, for example. The service provider can be a nursing home, a hospital, a clinic, a pharmacy, a physician, a physical therapist, a podiatrist or emergency medical technicians, for example.

The method can further include entering the service provider identification code into an electronic retrieval system. The electronic retrieval system can include a process, such as an internet query, an e-mail query, a network query, comparative information transfers and combinations thereof.

The method further includes registering an item of the service provider with the prescription healthcare provider to create a registered item 106 and identifying a claim code for each registered item 108. The item can include a prescription healthcare service 110 or good 112.

The method further includes issuing a smart card to a first person related to the prescription healthcare program 114. The smart card has a smart card identification feature to identify the first person 116. The smart card identification feature can include an identification code or a biometrics identification system (e.g., fingerprints or retinal scans) for example. The identification feature can further include personal data, such as date of birth, location of birth, height, weight, hair color and health history or government issued numbers, such as military ID numbers, driver's license numbers or passport numbers.

Preferably, using the smart card to determine if a person is eligible for benefits includes comparing first data obtained from a first person to second data obtained from a second person to obtain a verified identity. As discussed herein, it is assumed that the first person is the second person. In circumstances where a verified identity is not attained, the method terminates.

The smart card can be an electronically readable card including information, such as person name, person address, person phone number, person fax number, person email address, person social security number, healthcare program name, healthcare program address, healthcare provider phone number, healthcare provider fax number, healthcare provider e-mail address, healthcare program administrator, description of healthcare provider benefit plan, person payment amount, person's benefit history, other phone numbers, instructions on how to contact healthcare provider, expiration date of the smart card, healthcare provider website address and a chip to obtain the information on the healthcare program, for example.

The benefit history of the person can include information on length of time on healthcare provider programs and types of other programs the person is eligible to use, for example.

The smart card can be a plastic card with a chip in it or a plastic card with a magnetic strip. The chip or strip can contain information on a person and other related information. It is contemplated that a plastic smart card could be used with a magnetic strip containing key information without requiring a chip or with both a chip and a magnetic strip.

For the chip version of the smart card, the card is first manufactured in a conventional manner, and then the relevant information is downloaded from the computers of the government to the card. For a non-chip version of a smart card, the card manufacturer would be provided information about the person from the government and embed the relevant information in the magnetic strip and then mail or transfer the magnetic strip card to the user.

The smart card can contain information about benefits for which a person is eligible and an identification code, such as a "PIN or other type of identification such as retinal or biometric identification means.

The smart card is preferably an electronically readable card that can connect to a computer of the government agency, such as via the Internet or telephone line.

Typically, the smart card is created for the person but one card could be created for a group of persons. Furthermore, the "person," as used herein, can be a primary person to whom the smartcard is issued, another person, a spouse or at least one dependent, such as one or more children, for example.

The method further includes using the smart card 118 to determine if the person is the authorized bearer of the card 120 and is eligible for benefits from the healthcare program 122. The method can further include disposing marks on the smartcard. For example, the marks can include the prescription healthcare provider trademarks and logos, third party trademarks and logos and service provider trademarks.

The method further includes using the smart card to facilitate a first transmission from the service provider to the prescription healthcare provider 124. The smart card is used to not only contain the information described above, but to link to the healthcare provider's database and between the healthcare provider's database and the service provider's database and the service provider's bank account.

The method further includes using the smart card to facilitate the second transmission from the prescription healthcare provider to the service provider 126.

Additionally, the method can include transmitting funds from the healthcare provider to the service provider 132. Preferably, the funds are transmitted within from 1 to 21 days of receipt of the first transmission by the prescription healthcare provider and acknowledgment of the availability of accelerated payment by the prescription healthcare provider.

The method can further include creating a contractual relationship between the prescription healthcare provider and the service provider for the benefit of the person.

In one embodiment, the method includes a first and a second transmission.

The first transmission generally includes the service provider identification code, the person identification code, proposed information, a confirmation request, a claim codes list for items to be rendered and a request for accelerated payment by the service provider to the prescription healthcare provider. The proposed information can include item information for the person, corresponding claim codes for the proposed item and a statement stating that the proposed item is available to be provided to the person upon receipt of a second transmission, for example. The confirmation request can include the person's eligibility for benefits under the prescription healthcare program, a validation that the proposed item is approved for the person, the service provider's eligibility to render services or provide goods under the prescription healthcare program and a request to participate in an accelerated payment program for the proposed item.

The first transmission further can include additional information, such as a first transmission identification code, service provider information, person information, a date on which the benefit was rendered, a total amount to be charged relative to the person and detail information describing the item related to the claim codes for the rendered item, for example. The amount of payment from the person can be all or part of a co-payment fee, all or part of a deductible fee and combinations of these fees. Additionally, the first transmission can include a request to update personal data.

The service provider information can include a service provider code, a service provider name, a service provider address, a service provider office code and a service provider phone number, for example. The person information can include an person name, an person address, an person phone number, an person social security number, an person healthcare provider code, and healthcare information, for example. The healthcare information can include a provider number, a policy number, group number and employer information, for example.

The second transmission generally includes the person's eligibility for benefits under the prescription healthcare program, a validation on whether the proposed item is approved for the person, a validation on whether the service provider is eligible to render services under the prescription healthcare program, a determination on whether an accelerated payment program is available and, if available, an authorization for accelerated payment, an authorization code to provide the proposed item, a requirement to obtain and retain an acknowledgement by the person that information on the item was provided to the person by the service provider and a requirement to obtain and retain an acknowledgement that the product or service has been received by the person from the service provider.

The second transmission can further include an alert to the service provider that the person is responsible for a portion of funds required for the item and an indication of the amount of the portion of the fluids. Additionally, the second transmission can include dollar amount limits for the accelerated payment. The second transmission can further include a requirement to create and retain a record that a portion of the funds were collected from the person by the service provider. The second transmission can further include a verification of updated personal data.

Also, the second transmission can include a depiction of the person, a second transmission identification code and a statement as to any amount that exceeds an authorized cost of the authorized item, for example.

In another embodiment, the method includes a first, second and third transmission.

The first transmission generally includes a service provider identification code, an person identification code, proposed information, as described above and a confirmation request, as described above.

The second transmission generally includes the person's eligibility for benefits under the healthcare program, a validation that the proposed good or proposed service is approved for the person, a validation of the service provider's eligibility to render services under the healthcare program, an optional confirmation that an accelerated payment program is available and an authorization code to provide the proposed product and/or proposed service.

The third transmission from the service provider to the prescription healthcare provider generally includes a claim codes list for services rendered, acknowledgement by the person that information on the product and/or service was provided to the person, acknowledgement that the product or service has been received from the service provider and a request for accelerated payment by the private healthcare provider to the service provider.

In one embodiment, the smart card can be used to obtain information on funds which are available from the healthcare provider for a completed authorized social service for a particular person. The card can obtain information on the typical payment schedule for a particular social service. Generally, the phrase "completed authorized benefit" is considered to be a service that has been authorized by contract by the healthcare provider and rendered to the beneficiary of the benefit.

The accelerated fund payment schedule could be a 100% payment schedule or a partial accelerated fund payment schedule depending on the contract with the healthcare provider. It is contemplated that the funds would move electronically from the healthcare provider's bank account to the service provider's bank account, such as by wire transfer, or normal electronic banking procedures.

Additionally, the smart card can be used to obtain information about the various benefit plans held by the person and of the person use of one plan, and whether other plan benefits should be denied.

The methods described herein advantageously reduce fraud in administering prescription healthcare programs by providing a safe method of pre-authorizing users for benefits prior to rendering the benefit.

Embodiments of the invention also advantageously can prevent ineligible users from using services for which they are not authorized. For example, the methods described herein safe guard the government from users attempting to apply for the same service more than once, in other words "double dipping".

Further, the accelerated payment plan, as described herein, is a vast improvement over known systems that can take up to eight months to pay a service provider.

In addition, embodiments of the invention further provide a system/method wherein the smart card can be used to determine if a second opinion is required by the healthcare provider for the benefit.

Furthermore, the smart card would also enable third party intermediaries to report in a more expedited manner without additional labor. A third party intermediary can be an insurance provider, such as a private insurance company. The healthcare provider presently requires regular reports, both on an person basis and in aggregate, in order for the third party intermediaries to receive funds. Using the smart card eliminates the need for the third party intermediaries to create the reports because the smart card tracks and reports automatically.

FIG. 2 shows a smart card (500) that is contemplated as within the scope of the invention. The smart card is an electronically readable card containing person name (502); person address (504); person phone number (506); person fax number (508); person email address (510); person social security-number (512); healthcare program name (514); healthcare program address (516);

healthcare provider phone number (518); healthcare provider fax number (520); healthcare provider e-mail address (522); healthcare program administrator (524); description of healthcare plan (526); optional person payment amount (528); person's healthcare history (530) (this information can include information on length of time on healthcare provider programs and types of other programs the person is a participant); other phone numbers (532); instructions on how to contact healthcare provider (534); expiration date of the card (536); healthcare provider website (538); a chip to link to the healthcare provider for information on the healthcare program (540); and combinations thereof. Examples of each information type are located earlier in this description.

FIG. 3 shows an example of a smart card (500).

While the foregoing is directed to the preferred embodiments of the present invention, other and further embodiments of the invention can be devised without departing from the basic scope thereof, and the scope thereof is determined by the claims that follow.

What is claimed is:

1. A method for reducing fraud in a prescription healthcare program comprising:
   a. registering a service provider with a prescription healthcare provider and issuing a service provider identification code to the service provider;
   b. registering an item of the service provider with the prescription healthcare provider to create a registered item and identifying a claim code for each registered item, wherein each registered item is selected from the group consisting of at least one service, at least one good and combinations thereof;
   c. issuing a smart card to a first person related to the prescription healthcare program, wherein the smart card has a smart card identification feature to identify the person;
   d. using the smart card to determine if a second person:
      i. is an authorized bearer of the smart card; and
      ii. is eligible for a proposed item from the prescription healthcare program, wherein the proposed item is a registered item;
   e. using the smart card to facilitate a first transmission from the service provider to the prescription healthcare provider, wherein the first transmission comprises:
      i. the service provider identification code;
      ii. a personal identification code;
      iii. proposed item information selected from the group consisting of proposed item information for the second person, corresponding claim codes for the proposed item, a statement stating that the proposed item is available to be provided to the second person upon receipt of a second transmission and combinations thereof; and
      iv. a confirmation request, wherein the confirmation request comprises:
         1. a first query on whether the second person is eligible for the proposed item under the prescription healthcare program;
         2. a second query for a validation that the proposed item is approved for the second person;

3. a third query on whether the service provider is eligible to render services or provide goods under the prescription healthcare program; and
4. a request to participate in an accelerated payment program for the proposed item;
iv. a claim codes list for proposed items to be rendered; and
vi. an accelerated payment request by the service provider to the prescription healthcare provider.
f. using the smart card to facilitate the second transmission from the prescription healthcare provider to the service provider, wherein the second transmission consists of:
i. whether the second person is eligible for the proposed item under the prescription healthcare program;
ii. the validation on whether the proposed item is approved for the second person;
iii. whether the service provider is eligible to render services under the prescription healthcare program;
iv. a determination on whether the accelerated payment program is available and, if available, an authorization for accelerated payment;
v. an authorization code to provide the proposed item;
vi. a first acknowledgement by the second person that information on the proposed item was provided to the second person by the service provider, wherein the information includes instructions on use of the proposed item; and
vii. a second acknowledgement that the proposed item has been received by the second person from the service provider.

2. The method of claim 1, wherein the prescription healthcare program comprises prescription drugs, prescription healthcare equipment or combinations thereof.

3. The method of claim 1, wherein the prescription healthcare provider is selected from the group consisting of an insurance company, a drug manufacturer, a healthcare equipment manufacturer, a drug distributor, a healthcare distributor, a physician and combinations thereof.

4. The method of claim 1, wherein the service provider is selected from the group consisting of a nursing home, a hospital, a clinic, a pharmacy, a physician, a physical therapist, a podiatrist, emergency medical technicians and combinations thereof.

5. The method of claim 1, wherein the second transmission further comprises an alert to the service provider that the second person is responsible for a first portion of funds required for the proposed item and an indication of the amount of the portion of the funds.

6. The method of claim 1, wherein the second transmission further comprises dollar amount limits for the accelerated payment.

7. The method of claim 1, wherein the second transmission further comprises a third requirement to create and retain a record that the first portion of the funds was collected from the second person by the service provider.

8. The method of claim 1, further comprising transmitting a second portion of funds from the prescription healthcare provider to the service provider, wherein the second portion of funds are transmitted within from 1 to 21 days of receipt of the first transmission by the prescription healthcare provider and acknowledgment of the availability of accelerated payment by the prescription healthcare provider in the second transmission.

9. The method of claim 1, wherein the prescription healthcare program is selected from the group consisting of Medicare, Medicaid, other federal health programs, private healthcare insurance programs, other private health programs and combinations thereof.

10. The method of claim 1, wherein the smart card identification feature is selected from the group consisting of a personal identification code, a biometrics identification system, personal data, government issued numbers and combinations thereof.

11. The method of claim 1, wherein the first transmission further comprises information selected from the group consisting of:
a. a first transmission identification code;
b. service provider information selected from the group consisting of;
i. a service provider code;
ii. a service provider name;
iii. a service provider address;
iv. a service provider office code;
v. a service provider phone number;
vi. and combinations thereof;
c. personal information selected from the group consisting of:
i. person's name;
ii. person's address;
iii. person's phone number;
iv. person's social security number,
v. person's healthcare provider code;
vi. healthcare information selected from the group consisting of provider number, policy number, group number, employer information and combinations thereof;
vii. a date on which the proposed item was rendered;
viii. a total amount to be charged relative to the person;
ix. detail information describing the proposed item related to the claim codes for the registered item;
x. a request to update personal data on the person; and
ix. combinations thereof.

12. The method of claim 1, wherein the second transmission further comprises additional information selected from the group consisting of:
a. a depiction of the first person;
b. a second transmission identification code;
c. a statement as to any amount that exceeds an authorized cost of the proposed item;
d. verification of a request to update personal data on the person; and
e. combinations thereof.

13. The method of claim 1, wherein the smart card is an electronically readable card comprising smart card information selected from the group consisting of:
a. person's name;
b. person's address;
c. person's phone number;
d. person's fax number;
e. person's email address;
f. person's social security number;
g. prescription healthcare program name;
h. prescription healthcare program address;
i. prescription healthcare provider phone number;
j. prescription healthcare provider fax number;
k. prescription healthcare provider e-mail address;
l. prescription healthcare program administrator;
m. description of prescription healthcare provider benefit plan;

n. first portion of funds;
o. person's benefit history;
p. other phone numbers;
q. instructions on how to contact the prescription healthcare provider;
r. expiration date of the smart card;
s. prescription healthcare provider website address;
t. a chip to obtain the smart card information on the prescription healthcare program;
u. personal data;
v. health information; and
w. combinations thereof.

14. The method of claim 1, wherein a benefit history of the first person includes information on length of time on prescription healthcare provider programs and types of other programs the person is eligible to use.

15. The method of claim 1, further comprising creating a contractual relationship between the prescription healthcare provider and the service provider for the benefit of the second person.

16. The method of claim 1, further comprising disposing marks on the smart card, wherein the marks are selected from the group consisting of the healthcare provider trademarks and logos, third party trademarks and logos, service provider trademarks and logos and combinations thereof.

17. The method of claim 1 further comprising entering the service provider identification code into an electronic retrieval system.

18. The method of claim 17, wherein the electronic retrieval system comprises a process selected from the group consisting of an internet query, an e-mail query, a network query, comparative information transfers and combinations thereof.

19. The method of claim 1, wherein the using the smart card to determine if the second person is the authorized bearer of the card comprises comparing first data obtained from the first person to second data obtained from the second person to obtain a verified identity.

20. A method for reducing fraud in a prescription healthcare program comprising:
    a. registering a service provider with a prescription healthcare provider and issuing a service provider identification code;
    b. registering at least service or good of the service provider with the prescription healthcare provider and identifying a claim code for each registered service or registered good;
    c. issuing a smart card to a person related to the prescription healthcare program, wherein the smart card has a smart card identification feature to identify the person;
    d. using the smart card to determine if the person:
        i. is an authorized bearer of the card; and
        ii. is eligible for a proposed service or good from the prescription healthcare program;
    e. using the smart card to facilitate a first transmission from the service provider to the prescription healthcare provider, wherein the first transmission comprises:
        i. a service provider identification code;
        ii. a personal identification code;
        iii. proposed service information selected from the group consisting of proposed product information for the person; proposed service information for the person; corresponding claim codes for the proposed product; and corresponding claim codes for the proposed service; and
        iv. a confirmation request, wherein the confirmation request comprises:
            1. a first query on the person's eligibility for the proposed good or service under the prescription healthcare program;
            2. a second query for a validation that the proposed good or service is approved for the person;
            3. a third query on the service provider's eligibility to render services or provide goods under the prescription healthcare program; and
            4. an optional request to participate in an accelerated payment program for the proposed good or the proposed service;
    f. using the smart card to facilitate a second transmission from the prescription healthcare provider to the service provider, wherein the second transmission consists of:
        i. the person's eligibility for benefits under the prescription healthcare program;
        ii. a validation that the proposed good or proposed service is approved for the person;
        iii. a validation of the service provider's eligibility to render services under the prescription healthcare program;
        iv. an optional confirmation that an accelerated payment program is available; and
        v. an authorization code to provide the proposed product and/or proposed service;
    g. using the smart card to facilitate a third transmission from the service provider to the prescription healthcare provider, wherein the third transmission comprises:
        i. a claim codes list for services rendered;
        ii. acknowledgement by the person that service information on the product and/or service was provided to the person;
        iv. acknowledgement that the product or service has been received from the service provider; and
        v. a request for accelerated payment by the private healthcare provider to the service provider.

* * * * *